United States Patent
Dean

(10) Patent No.: US 11,433,965 B2
(45) Date of Patent: Sep. 6, 2022

(54) BICYCLE LIGHT

(71) Applicant: Sinewave Inc., Cambridge, MA (US)

(72) Inventor: David Dean, Cambridge, MA (US)

(*) Notice: Subject to any disclaimer, the term of this patent is extended or adjusted under 35 U.S.C. 154(b) by 92 days.

(21) Appl. No.: 16/401,997

(22) Filed: May 2, 2019

(65) Prior Publication Data

US 2019/0256160 A1 Aug. 22, 2019

Related U.S. Application Data

(63) Continuation of application No. PCT/US2017/059866, filed on Nov. 3, 2017.

(Continued)

(51) Int. Cl.
| | |
|---|---|
| *B62J 6/01* | (2020.01) |
| *H05B 45/10* | (2020.01) |
| *B62J 6/06* | (2006.01) |
| *B62J 6/015* | (2020.01) |
| *H05B 45/3725* | (2020.01) |
| *B62J 6/028* | (2020.01) |
| *B62J 6/14* | (2006.01) |
| *B62J 6/12* | (2006.01) |
| *B62J 6/08* | (2006.01) |
| *H05B 45/375* | (2020.01) |
| *H05B 45/38* | (2020.01) |
| *H05B 45/12* | (2020.01) |

(52) U.S. Cl.
CPC .............. *B62J 6/01* (2020.02); *B62J 6/015* (2020.02); *B62J 6/028* (2020.02); *B62J 6/06* (2013.01); *H05B 45/10* (2020.01); *H05B 45/3725* (2020.01); *B62J 6/08* (2013.01); *B62J 6/12* (2013.01); *B62J 6/14* (2013.01); *H05B 45/12* (2020.01); *H05B 45/375* (2020.01); *H05B 45/38* (2020.01)

(58) Field of Classification Search
CPC ....... B62J 6/015; B62J 6/01; B62J 6/00; B62J 6/02; B62J 6/06; B62J 6/14; B62J 6/12; B62J 6/08; H05B 45/10; H05B 45/37; H05B 45/38; H05B 45/3725; H05B 45/375; H05B 45/12
See application file for complete search history.

(56) References Cited

U.S. PATENT DOCUMENTS

| | | | |
|---|---|---|---|
| 4,555,656 A | 11/1985 | Ryan | |
| 6,104,103 A * | 8/2000 | Siewert | H02J 9/061 307/64 |

(Continued)

OTHER PUBLICATIONS

The International Search Report dated Sep. 12, 2018 for PCT Application No. PCT/US17/59866 (published with WO 2018/144091 A3).

(Continued)

*Primary Examiner* — Borna Alaeddini
(74) *Attorney, Agent, or Firm* — Prince Lobel Tye LLP

(57) ABSTRACT

A bicycle light that is constructed and arranged to be supplied with input electrical power. The power can be supplied by multiple power sources, or not. When there are multiple power sources, the bicycle light includes a circuit that is adapted to deliver power to the light source from any of the power sources. The bicycle light can have an electrical power output, and a circuit that is adapted to deliver power to the light source and the power output.

5 Claims, 7 Drawing Sheets

Related U.S. Application Data

(60) Provisional application No. 62/417,117, filed on Nov. 3, 2016.

(56) References Cited

U.S. PATENT DOCUMENTS

| | | | | |
|---|---|---|---|---|
| 7,564,192 | B2 | 7/2009 | Collins et al. | |
| 7,729,822 | B2* | 6/2010 | Le Gars | G07B 15/02 340/432 |
| 8,651,714 | B1* | 2/2014 | Hamasaki | B62J 6/02 362/473 |
| 8,770,808 | B1* | 7/2014 | Campbell | B62J 11/00 362/800 |
| RE47,688 | E* | 11/2019 | McCaslin | B62J 6/015 |
| 10,766,554 | B1* | 9/2020 | Emerson | F21V 31/04 |
| 2006/0072330 | A1* | 4/2006 | Koharcheck | B62J 6/08 362/473 |
| 2008/0174210 | A1* | 7/2008 | Kitamura | H05B 45/37 310/67 A |
| 2011/0148611 | A1* | 6/2011 | Ni | B62J 6/165 340/432 |
| 2012/0182748 | A1* | 7/2012 | McCaslin | F21V 23/06 362/105 |
| 2013/0141933 | A1* | 6/2013 | Leonardo | B62J 6/029 362/183 |
| 2013/0301285 | A1* | 11/2013 | McCaslin | B62J 6/015 362/103 |
| 2014/0152019 | A1* | 6/2014 | Voorhees | F03G 7/10 290/1 E |
| 2016/0339978 | A1* | 11/2016 | Braucht | H05B 45/10 |
| 2017/0203802 | A1* | 7/2017 | Zhao | B62J 6/01 |
| 2021/0335285 | A1* | 10/2021 | Liu | H02J 7/0047 |

OTHER PUBLICATIONS

The International Preliminary Report on Patentability dated May 7, 2019 for PCT Application No. PCT/US17/59866.

* cited by examiner

BICYCLE LIGHT

CROSS-REFERENCE TO RELATED APPLICATIONS

This application claims priority of PCT Application PCT/US17/59866 filed on Nov. 3, 2017, and of Provisional application 62/417,117 filed on Nov. 3, 2016.

BACKGROUND

This disclosure relates to a bicycle light.

Bicycle lights are typically powered by a dynamo that is turned by a moving part of the bicycle, as further explained below. Three particular commercial bicycle lights are as follows. One is a dynamo-powered headlight with three LEDs. A pushbutton turns the light on or off. The headlight has one input wire for power from the dynamo. There is one output wire to connect an optional taillight. The taillight output is DC. A second is a dynamo-powered headlight with one main LED and other "daytime running" LEDs. The headlight also features a USB charger. The USB charger output is combined with an on/off switch that is mounted on the handlebars. A third is a dynamo-powered headlight with three LEDs. The light and electronics are separate and are connected by a wire. A toggle switch on the electronics selects off/normal/high modes.

SUMMARY

The present bicycle light can be supplied with input electrical power by both an external dynamo power source and a battery power source. The battery power source may be internal to the light, or external to the light, or both. The bicycle light includes a light source and a circuit that is adapted to deliver power to the light source from one or both of the power sources.

The circuit may be further adapted to detect which one or both power sources are electrically coupled to the bicycle light and deliver power to the light source in a manner that depends on the detected power sources.

The circuit may be further adapted to deliver power to the light source simultaneously from both power sources.

The light source may include a plurality of separate light-emitting devices, and the circuit may be further adapted to deliver power from each power source to zero, one, or more, of the light-emitting devices.

The bicycle light may have an electrical power output, and the circuit may be further adapted to deliver power to the electrical power output. The circuit may be adapted to deliver power to the electrical power output simultaneously from both power sources, or separately from one power source at a time.

The electrical power output may be separate from a taillight output. The electrical power output may be used to power an external device. The electrical power output may be used to charge a battery. The electrical power output may be a USB charger output. The voltage of the electrical power output may be regulated; the regulated voltage may be 5V.

The circuit may be further adapted to regulate the current supplied to the light source. The bicycle light may further comprise a means (such as a switch or a sensor (e.g., an ambient light sensor), for example) to select a between high brightness mode where full power is provided to the light source, and a low-brightness mode where a reduced amount of power is provided to the light source.

The circuit may detect an external power source and the voltage of the detected external power source, and adjust the voltage as necessary for the particular light source.

The light source may include a plurality of separate light-emitting devices, and the circuit may be further adapted to deliver power to all of, or fewer than all of, the light-emitting devices. The external battery power source may be a 5V battery pack. The light source may have a plurality of separate light-emitting devices, and the circuit may further comprise a boost voltage regulator or a boost LED driver that increases input voltage to a voltage that is high enough to simultaneously light one, more than one, or all of the light-emitting devices.

The following includes several aspects of the present bicycle light:

Including in an electrical bicycle light, a port to connect either an external dynamo power source or an external battery power source, a circuit to detect which power source is connected, and a circuit to deliver power to a light-emitting element in a manner depending on the detected input source.

Benefits/Advantages

Ability to power light from a bicycle dynamo.

Ability to power light from an external battery, in case a dynamo is not available, the bicycle is stopped, or the cyclist will be riding slowly and the dynamo output will produce too little light.

Ability to work with a standard USB input. Most headlights that use an external battery are designed to work with proprietary battery packs which are usually higher voltage (7.4V) and therefore require a special charger. USB battery packs are fairly ubiquitous and also easy to charge, including from the USB charger in the headlight itself.

Without detecting the input source, the functionality of the design will be limited to use with a narrow range of battery packs. For example, three LEDs requires 9V so a 5V or 7.4V battery cannot be used.

Without detecting the input source, the LED driver circuitry is forced to be a more general solution that may not optimize use of either input source. For example, a battery power source requires current regulation, but the dynamo power source does not. Without input source detection, the current regulation circuitry will be used with the dynamo power source as well, resulting in less efficiency when the dynamo power source is used.

Including in an electrical bicycle light, a port to connect to an external dynamo power source, a port to connect to an external battery power source, and a circuit to mediate the simultaneous use of power from the two sources.

Benefits/Advantages:

Ability to power light from a bicycle dynamo.

Ability to power light from an external battery, in case a dynamo is not available, the bicycle is stopped, or the cyclist will be riding slowly and the dynamo output will produce too little light.

Ability to connect both the dynamo and battery at the same time. This will provide a constant amount of light regardless of speed as the battery will provide any power that is not available from the dynamo. Alternatively, the battery will provide a reduced amount of power that is sufficient to eliminate flicker at low speed. As the power from the dynamo increases it replaces the battery input, eventually completely powering the light and stopping any draw from the battery.

Will work with a standard USB input. Most headlights that use an external battery are designed to work with proprietary battery packs which are usually higher voltage (7.4V) and therefore require a special charger. USB battery packs are ubiquitous and also easy to charge, including from the USB charger in the headlight itself.

Including in an electrical bicycle light, a means of delivering power to a light-emitting element, a means of delivering power to an electrical power output, and a means to adjust the power available to either.

Benefits/Advantages

There are cases where a reduced light output is preferred—e.g., during daytime, while riding on a well-lit street, to reduce the electrical use and thus drag on the wheel.

When connected to a dynamo in parallel with a USB charger, a full-power headlight will draw enough power to reduce the functionality of the USB charger. In many cases it is acceptable to reduce the light output and allow for better charging performance (such as the above situations). The low-brightness mode will limit the light to a small portion of the power normally provided by the dynamo, allowing for more power to be used by the charger.

Alternatively, it may be acceptable to limit the power available to the electrical power output to allow the electrical power output to remain active in a reduced-power mode while maintaining high brightness from the light output.

Including in an electrical bicycle light, a means of delivering power to a light-emitting element, a means of delivering power to an electrical power output, and a means to adjust priority between the two.

Benefits/Advantages:
Creates a controlled way for the light output and electrical power output to share the power from the dynamo without one taking more power from the other more than desired.
The light output can have priority for the initial power available from the dynamo, ensuring that the light output is always able to maintain at least a minimum brightness level.
The electrical power output can have priority for the remainder of the power. This ensures better charging performance from the electrical power output as the light output will not be using power that is desired to be used by the electrical power output.
If the electrical power output does not use the power available to it (because the external device is unplugged or fully charged) it will not use any power and the power will instead be used by the light output.
If the electrical power output uses the power available to it, but more power than required is available from the dynamo, the excess power will also be used by the light output.

Explanation of certain terms used herein:

Dynamo
A dynamo is a device that is constructed and arranged to generate electricity from rotation. On a bicycle, this rotation can be caused by several means.
A hub dynamo is a special hub built into the bicycle wheel that rotates along with the rim.
A bottle dynamo is a separate roller that turns when in contact with the tire or rim of the bicycle wheel.
A spoke dynamo attaches to the spokes of a bicycle wheel and rotates along with the wheel.
A chain dynamo rotates when engaged with the bicycle chain.
A bicycle dynamo is not actually a "dynamo" in a strict technical sense, but is actually a "magneto". Regardless, the term "dynamo" is used within the bicycle industry. The term "generator" is often used as well, as in "bottle generator" or "generator hub".

External Battery
Many bicycle headlights contain an internal battery that is used to power the headlight. In many cases this internal battery is the sole power source and must be recharged when depleted. Some dynamo-powered headlights also contain an internal battery that is charged from the dynamo while riding. The energy stored in the internal battery can be used to power the light when the dynamo input is removed, for example when the bicycle is stopped.
An external battery is a separate unit containing a battery that is connected to the headlight with a wire. The external battery is recharged through some separate means. An external battery can provide a large range of voltages. Common values are 3.7V (a single Lithium Ion cell), 5V (a USB battery pack), 7.4V (dual Lithium Ion cells), 9V (a 9V alkaline battery), and 12V (a car battery). Many other voltages are available from different chemistries and configurations.
The DC input can alternatively be provided by another type of energy storage device, such as a supercapacitor.

Priority
A "current sink" is an element that draws current in an electrical system. A "current source" is an element that provides current in an electrical system. There are different ways to handle a system where multiple current sinks are connected to one current source.
In a system where enough current is available from the current source to provide all the current used by the current sinks, the current sinks can simply be connected to the current source with no further complication.
In a system where the current source cannot provide the total current that can be used by the current sinks, if the current sinks draw more current than can be provided by the current source, the output voltage of the current source (and input voltage to the current sinks) will sag or oscillate. If no additional system is in place the behavior of the system will depend on several variables, including the current available from the current source, the current expected by each current sink, and the voltage requirements of each current sink. Such behavior is very difficult to predict, and may result in undesirable behavior, non-functionality, or damage of the current source or current sinks.
Deterministic and safe performance of the above system can be accomplished by implementing a priority scheme among the current sinks. The current source can be the only element that implements the priority scheme, or the current sinks can be designed as part of the scheme. An example priority scheme would assign priority to one current sink, and allow only that current sink to draw current up until a threshold.

USB Charger
A power adapter that provides the standard 5VDC required by a USB device. The USB charger may include circuitry to rectify AC voltage to DC, and/or to convert a higher or lower voltage to 5V.

Light-Emitting Device
A device or system that converts electrical power to light. Examples are an incandescent light bulb or LED (Light-Emitting Diode).

Electrical Power Output
An output used to provide power to charge or power an external device. This is separate from a taillight output. An example of an electrical power output is a USB charger output, used to provide power to a USB device.

DETAILED DESCRIPTION

Figure 1:
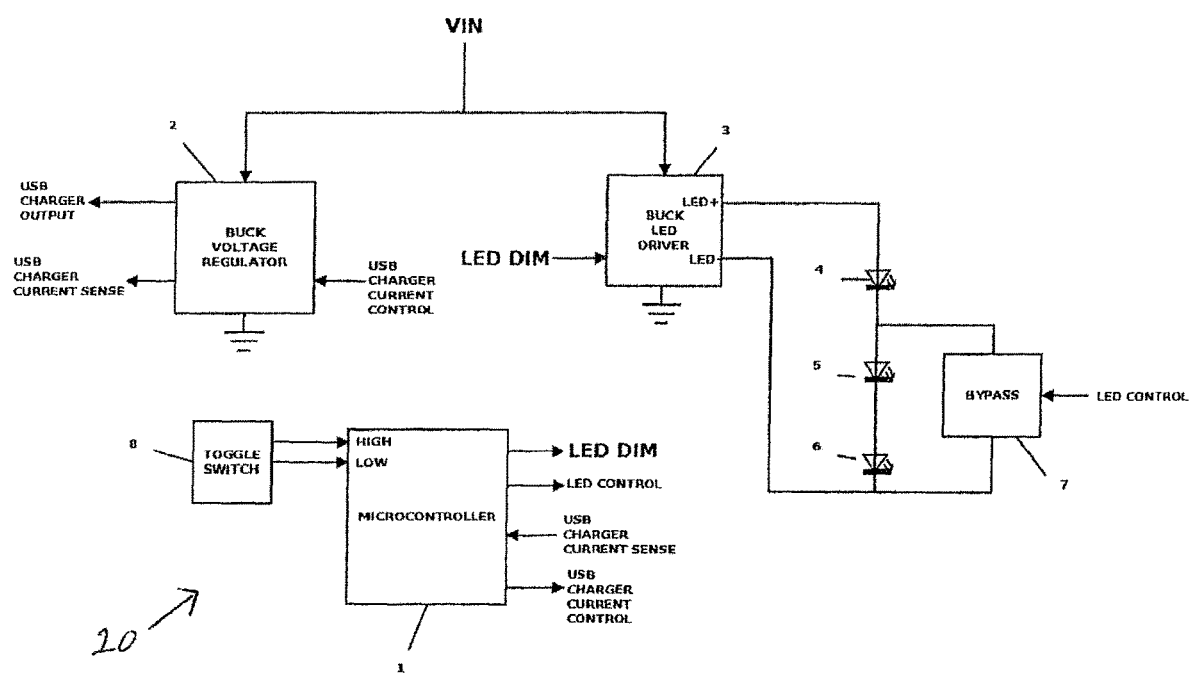
FIG. 1 is schematic diagram of a bicycle light operating in a reduced power mode.

Following includes a detailed description of several embodiments of the inventive bicycle light.
Reduced Power Modes The headlight uses three LEDs to generate light, although any number of LEDs could be used, or any light-emitting devices such as incandescent or halogen bulbs.

The headlight supports two modes, "high brightness" and "low brightness". In "high brightness" mode the electrical power output operates in a limited power mode, reducing the effect of the electrical power output on the brightness of the light. No current limiting of the LEDs is enabled, allowing the LEDs to use whatever current is available from the dynamo. The limited power mode of the electrical power output is accomplished by monitoring the output current of the electrical power output and reducing the voltage of the electrical power output in response to the output current level. Other means may be used to implement the reduced power mode. Alternatively, the electrical power output may be disabled in high brightness mode.

In "low brightness" mode a buck LED driver will be used to set a reduced LED current. This reduces the effect of the light output on the power available from the electrical power output. The reduced power mode of the light output is accomplished by using the dimming function of an LED driver. In the present circuit the dimming input is a PWM signal and the current output is set by the duty cycle of the PWM signal. Another version of dimming control is an analog signal, where the current output is set by an analog voltage. The buck LED driver can be an integrated circuit or a discrete switch controlled by a microcontroller or other device.

In an alternative embodiment, the external power output is not included in the bicycle headlight. In this alternative, "low brightness" mode reduces the power used by the bicycle headlight and may reduce the effect of the power used by the headlight on an external device. An example of an external device is a device used to generate an electrical power output, such as an external USB charger.

The buck LED driver requires a voltage at least equal to the forward voltage of the LEDs being illuminated. The LEDs used have a forward voltage of about 3V. The LEDs in the current circuit are Cree XP-G3, available from Cree, Inc. of Durham, N.C., USA. Many other LEDs from Cree and other manufacturers can be used. It is not required that the LEDs have a forward voltage of approximately 3V.

In the current circuit the electrical power output is a USB charger. The voltage regulator for the USB output is a buck voltage regulator. It requires an input voltage at least equal to the target output voltage. The target output voltage for USB is 5V.

In addition to regulating the LED current, it is possible to disable any number of the LEDs. In low brightness mode, two of the LEDs will be disabled and only one will be illuminated. In this circuit, the input voltage will remain at the forward voltage of the one LED until the target LED current is met. At this point the buck LED driver will begin to regulate the current and the input voltage will rise. Once the input voltage rises to 5V, the USB voltage regulator will begin to regulate the USB output voltage. In this circuit, the LED driver will draw power from the dynamo before the USB charger. However, once the LED current reaches a threshold, all additional current will be available to the USB charger. This also means that any fluctuations in the current used by the USB charger circuit will not affect the output of the LEDs.

The switch control can be done with a toggle switch. Alternatively, another type of switch can be used, or there is no physical switch and the system sets the mode automatically based on other variables. The toggle switch has three positions for HIGH BRIGHTNESS/OFF/LOW BRIGHTNESS modes. Alternatively, the light does not have an "OFF" setting and the switch only has two positions; HIGH BRIGHTNESS/LOW BRIGHTNESS. The toggle switch is connected to a microcontroller that monitors the state of the switch and controls the electrical power output circuit and LED driving circuit accordingly (dimming control, enabling/disabling LEDs). This could be accomplished in other ways:

Using the toggle switch to directly control the circuitry, rather than going through a microcontroller Using the toggle switch to alternate directly between two power sources of normal and low capacity Priority Switch The headlight supports two modes—"normal" and "charger priority". In normal mode no current limiting of the LEDs is enabled, allowing the LEDs to use whatever current is available from the dynamo. The dynamo itself is designed to provide a maximum of about 500 mA. All components can tolerate that much current so it is not required to reduce the current below what is provided from the dynamo.

In charger priority mode, initially only one LED will be enabled. The LED driver will be used to set a reduced maximum current through the one enabled LED. In the present circuit the dimming input is a PWM signal and the current output is set by the duty cycle of the PWM signal. Another version of dimming control is an analog signal, where the current output is set by an analog voltage.

In this circuit the input voltage will remain at the forward voltage of the one LED until the target LED current is met. At this point the LED driver will begin to regulate the current and the input voltage will rise.

The LED driver requires a voltage at least equal to the forward voltage of the LEDs being illuminated. The LEDs used have a forward voltage of about 3V. The LEDs in the current circuit are Cree XP-G3. Many other LEDs from Cree and other manufacturers can be used. It is not required that the LEDs have a forward voltage of approximately 3V.

In the current circuit the electrical power output is a USB charger. Once the input voltage rises to 5V, the voltage regulator will begin to regulate the USB output voltage. The voltage regulator for the USB output is a buck voltage regulator. It requires an input voltage at least equal to the target output voltage. The target output voltage for USB is 5V.

If the power available from the dynamo is greater than is used by the voltage regulator the input voltage will continue to rise. The circuit is configured in such a way that the disabled LEDs will begin to illuminate once the input voltage rises above the forward voltage of the multiple LEDs.

This circuit will guarantee a minimum brightness for the LEDs, at least enough light to be used as a "be seen" light. The USB charger will have priority to use any additional power available from the dynamo. Any power that the USB charger does not use will instead be used by the LEDs, resulting in increased brightness.

In an alternative embodiment, the external power output is not included in the bicycle headlight. In this alternative, when the headlight is set to "charger priority" mode, an external device will have priority to use any additional power available from the dynamo. An example of an external device is a device used to generate an electrical power output, such as an external USB charger.

The switch control is done with a toggle switch. Alternatively, another type of switch can be used, or there is no physical switch and the system sets the mode automatically based on other variables. The toggle switch has three positions for NORMAL/OFF/CHARGER PRIORITY modes. Alternatively, the light does not have an "OFF" setting and the switch only has two positions; NORMAL/CHARGER PRIORITY. The toggle switch is connected to a microcontroller that monitors the state of the switch and controls the LED driving circuit accordingly (dimming control, enabling/disabling LEDs). This could be accomplished in other ways:
  Using the toggle switch to directly control the circuitry, rather than going through a microcontroller
  Using the toggle switch to alternate directly between two power sources of normal and low capacity Dual Power Source The main power input is capable of using either AC (from the dynamo) or DC (from an external battery), so it is possible to connect this input to either the dynamo or the battery pack. If the LEDs used have a forward voltage of 3V, it requires a minimum of about 9V to illuminate all three LEDs. The dynamo is able to provide that level of voltage, but the battery pack is often limited to less—for example, 5V for a USB battery pack and 7.4V for a dual-cell lithium ion battery.

The microcontroller is able to detect whether the power source is a dynamo or battery. This is accomplished by monitoring both the input voltage and the input frequency.

The input voltage is measured through a resistor ladder to limit the voltage seen by the microcontroller to a safe level. In the present circuit the limit is 3.3V. The resistors used in the resistor ladder set a linear relationship between the voltage measured by the microcontroller and the actual input voltage.

The input frequency is determined by measuring the period of the rectified input signal from the dynamo. A series resistor is used to limit the amount of current that can flow through this signal. A pair of diodes is used to limit the signal seen by the microcontroller to the window between 0V and 3.3 V. The microcontroller detects a rising or falling edge of this signal and measures the time between edges. This time can be used to calculate the frequency of the input signal.

If the input frequency is zero then the input is DC and is assumed to be a battery. If the input frequency is non-zero then the input is AC and is assumed to be a dynamo. The detection circuitry looks for a zero crossing that would only be present in an AC input. This will avoid false detection of a noisy signal on the battery input. It is possible to use other means of measuring the input frequency, and other means of dealing with potential noise.

If dynamo input is detected, the system will operate normally:
  LED current is not regulated and provided directly by the dynamo.
  All three LEDs are enabled.

If battery input is detected, the system will operate in one of two modes:
  The battery will be used to power one LED. This requires about 3V so can be done from the battery input, which will be 5V for a USB battery pack and 7.4V for a dual-cell lithium ion back. The other two LEDs will be disabled.
  The battery input will go through a boost circuit that will increase the voltage to the approximately 9V required to illuminate all three LEDs.
    This can be done in parallel with the buck LED driver used for dynamo input. The buck LED driver will be disabled and a boost LED driver will boost the voltage and regulate the current through all three LEDs.
    This can be done in series with the buck LED driver. A boost voltage regulator will be used to increase the input voltage above 9V. This voltage will be used as an input to the buck LED driver which can now use this voltage to drive all three LEDs.

Simultaneous Power Source

In the "Dual Power Source" system, the single power input passes through a bridge rectifier, to convert from AC to DC. While that circuit is required for the dynamo input, it adds additional, unnecessary power losses for a battery input. The "Dual Power Source" method also limits the system to only one input at a time.

In the simultaneous power system, there are separate ports for input from the dynamo and battery. The dynamo input is rectified to DC as described previously. The battery input does not need to be rectified. It may be desirable to use a half-wave rectifier or other protection circuitry for the battery input in case of reverse polarity input. This protection can also be implemented with a polarized mechanical connector, among other solutions.

The dynamo input is used to directly drive the LEDs.

The battery input goes to a boost LED driver that is used to increase the voltage and drive all three LEDs at a regulated current. This current is set at 500 mA to match the expected current from the dynamo Higher or lower current levels can be used as well. An example of a boost LED driver is the Texas Instruments TPS61165.

The dynamo input will be used in parallel with the battery and boost LED driver. Any current available from the dynamo will be used to power the LEDs. Current from the battery and boost LED driver will be used only to make up the difference between the current from the dynamo and the regulated current set in the boost LED driver (in this case 500 mA).

This is accomplished by passing the current from the dynamo through the current sense resistor that is used by the boost LED driver to regulate its output current. The boost LED driver measures the voltage across the current sense resistor and adjusts its output current in order to regulate the voltage across the sense resistor to a certain voltage. For example, the Texas Instruments TPS61165 regulates this voltage to 200 mV. If the value of the sense resistor is 400 mΩ, the resulting regulated current will be (200 mV/400 mΩ)=500 mA. When current from the dynamo flows through the current sense resistor it will increase the voltage across the resistor and the boost LED driver will react by providing less current in order to meet the voltage threshold. This will reduce the current used from the battery while maintaining the target LED current of 500 mA.

In one example, if 100 mA from the dynamo flows through the LEDs and sense resistor, the boost LED driver will only need to provide 400 mA to bring the total to 500 mA.

When the current from the dynamo is 500 mA the voltage across the sense resistor will be at the target voltage with no current from the boost LED driver. At this point no current will be provided from the boost LED driver and the battery will not provide any power to the system. If current from the dynamo reduces to the point where the voltage across the sense resistor falls below the target voltage the boost LED driver will resume providing current to the LEDs and will operate as previously described.

The boost LED driver will be able to work with a wide range of input voltages, and will be able to generate an output voltage of at least 9V, to be able to drive the three LEDs. However, the boost LED driver can be damaged if exposed to higher voltages from the dynamo. A diode is used to protect the boost driver from the higher dynamo voltage. This diode is part of the standard boost LED driver circuitry but will serve an extra function as a means of protection from the higher voltage.

As long as the battery input is available and the headlight is turned on, the LEDs will be illuminated at the current configured in the boost LED driver. The amount of current from the dynamo and amount of current from the battery will adjust automatically and without interaction from the user. The light will not flicker or dim as the user starts, stops, or changes speed while riding.

DETAILED DESCRIPTION OF THE DRAWINGS

FIG. 1: Reduced Power Modes of Bicycle Light 20

Signals from the toggle switch 8 are connected to pins of the microcontroller 1. The microcontroller pins are configured as inputs.

Firmware running on the microcontroller will monitor the signals from the toggle switch.

The microcontroller will generate an LED DIM signal. This pin is configured as an output.

The microcontroller will generate an LED CONTROL signal. This pin is configured as an output.

The electrical power output is configured as a USB charger. The buck voltage regulator 2 circuitry generates a USB CHARGER CURRENT SENSE signal. This is an analog signal with a voltage proportional to the output current of the USB Charger Output. This signal is connected to a pin of the microcontroller. This pin is configured to perform an analog-to-digital function.

The microcontroller will generate a USB CHARGER CURRENT CONTROL signal. This pin is configured as an analog output. In an alternative implementation this pin generates a PWM signal.

The input voltage is connected to both the buck voltage regulator and buck LED driver 3. The buck voltage regulator is configured to generate an output of 5V. In this configuration the buck voltage regulator requires a minimum input voltage above 5V. The buck LED driver is configured to regulate the LED current to 1000 mA. The buck LED driver requires a minimum input voltage above the total forward voltage of the LEDs to be illuminated. Each LED 4, 5, 6 has a forward voltage of approximately 3V. If all three LEDs are enabled, the total forward voltage is 9V and the minimum input voltage must be above 9V. If only one LED is enabled, the total forward voltage is 3V and the minimum input voltage must be above 3V.

The bypass circuitry 7 is able to bypass two LEDs 5, 6. This is implemented by a switch that shorts out the LEDs to be bypassed.

The LED CONTROL signal is used to control the bypass circuitry.

The LED DIM signal is used to adjust the average current from the buck LED driver. This is a PWM signal with a duty cycle that can be adjusted from 0% to 100%. The average LED current will be a proportion of the configured maximum of 1000 mA based on the duty cycle of the DIM signal. For example, if the duty cycle of the DIM signal is 30% and the configured maximum LED current is 1000 mA, the average LED current will be (1000 mA×0.3)=300 mA.

The USB CHARGER CURRENT CONTROL signal is used to reduce the output voltage of the USB CHARGER OUTPUT. Increasing the analog output voltage of USB CHARGER CURRENT CONTROL will decrease the output voltage of USB CHARGER OUTPUT, which will reduce the output current of the USB Charger Output.

When the system is in high brightness mode, as set by the toggle switch, the microcontroller will drive LED CONTROL such that the bypass circuit is disabled and all three LEDs 4, 5, 6 are active. The microcontroller will also drive DIM at a duty cycle of 100%. This will result in the configured maximum current flowing through all three LEDs, or the maximum current available from the input source, whichever is less.

When the system is in high brightness mode the microcontroller will monitor USB CHARGER CURRENT SENSE. If the USB Charger output current rises above a threshold the microcontroller will increase the voltage of signal USB CHARGER CURRENT CONTROL until the USB Charger Output current is reduced to the threshold. This implements a limit for the USB Charger Output current.

When the system is in low brightness mode, as set by the toggle switch, the microcontroller will drive LED CONTROL such that the bypass circuit is enabled and only one LED 4 is active. The microcontroller will also drive DIM at a duty cycle of less than 100%. For example, the duty cycle may be 30%, this would result in 300 mA flowing through one LED.

When the system is in low brightness mode the microcontroller will not drive the USB CHARGER CURRENT CONTROL signal. This will disable any current limit on the USB Charger Output.

When the system is in high brightness mode, power to the USB Charger will be limited, allowing for more power to be directed to the LEDs When the system is in low brightness mode, a reduced amount of power will be directed to the LEDs, resulting in more power being available to the buck voltage regulator and USB charger output.

Figure 2:
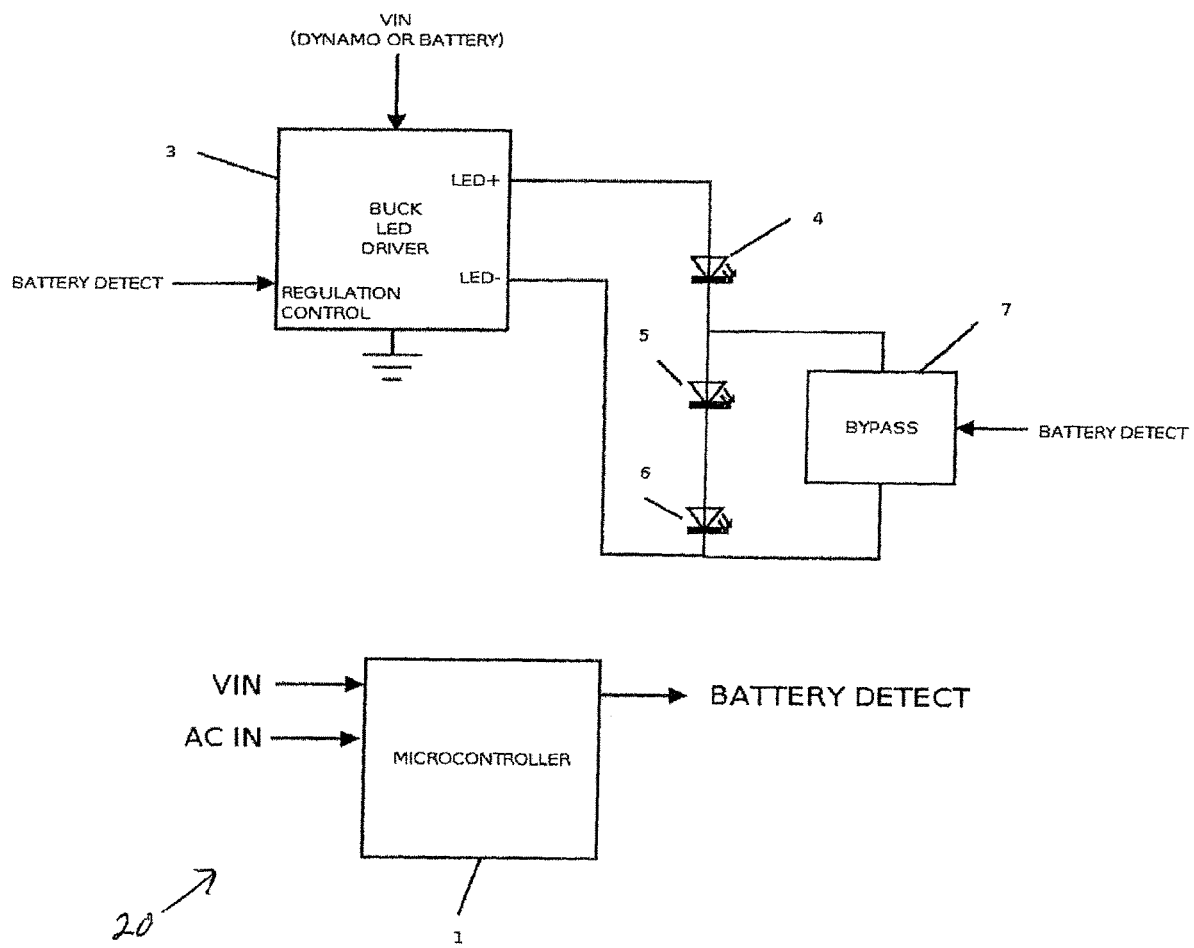
FIG. 2 is schematic diagram of a bicycle light operating in a first dual power mode.

FIG. 2: Dual Power Mode 1—Three LEDs from Dynamo, One LED from Battery, for Bicycle Light 20

The system voltage is connected to the microcontroller 1. This microcontroller pin is configured as an analog-to-digital function. The microcontroller will measure the voltage on this pin to determine the voltage of the system input.

A rectified, voltage-limited version of the input is connected to the microcontroller. The microcontroller will be configured to measure the time between rising or falling edge transitions of this signal.

The microcontroller will generate the signal BATTERY DETECT. This pin will be configured as an output.

The microcontroller will monitor the AC IN signal to measure the frequency of the input voltage. If the measured frequency is greater than zero, the input voltage is AC and the input power source is determined to be a dynamo. If the measured frequency is zero, the input voltage is DC and the input power source is determined to be a battery.

When the input power source is determined to be a dynamo, the system will operate in dynamo mode. In dynamo mode the microcontroller will disable BATTERY DETECT. This will disable the bypass circuit 7 and all three LEDs 4, 5, 6 are enabled. Further, the buck LED driver 3 will be configured to disable current regulation. The dynamo has a built-in current limit of about 500 mA so further regulation is not required. Alternatively, the buck LED driver is configured to enable current regulation and set a current threshold to protect the circuitry in case the dynamo power source can provide more than the expected amount of current.

When the input power source is determined to be a battery, the system will operate in battery mode. Supported battery voltages will be 7.4V and less, which are not enough to illuminate all three LEDs. In battery mode, the microcontroller will enable BATTERY DETECT. This will enable the bypass circuit and only one LED 4 will be enabled. The will result in a forward voltage of only 3V, enabling the battery to illuminate the LED. The LED driver will be configured to enable the current regulation and set it to a certain value. For example, the LED driver can regulate the LED current to 1000 mA.

Figure 3:
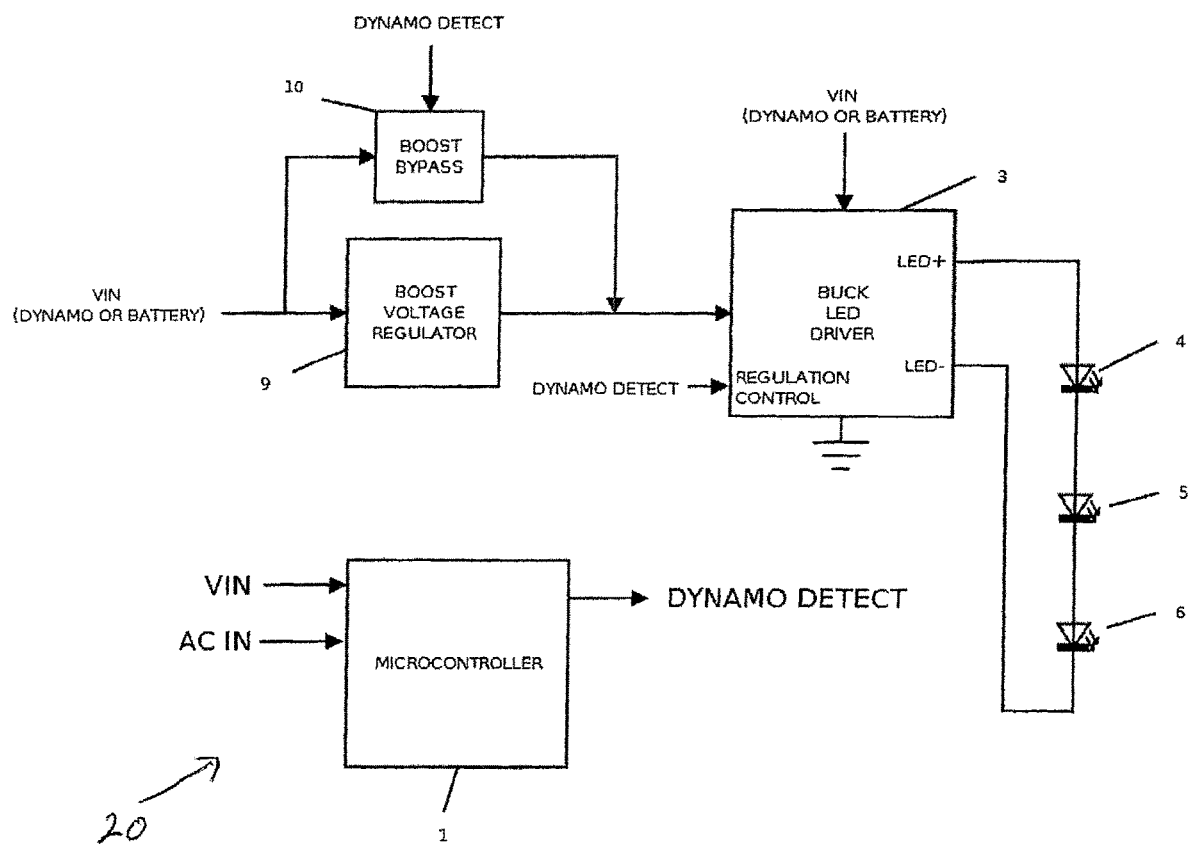
FIG. 3 is schematic diagram of a bicycle light operating in a second dual power mode.

FIG. 3: Dual Power Mode 2—Boost Battery for Buck LED Driver of Bicycle Light 20

The microcontroller 1 is configured in the same manner as FIG. 2. However, in this drawing the DYNAMO DETECT output signal will be enabled when the input power source is determined to be a dynamo. It will be disabled when the input power source is determined to be a battery.

When the input power source is determined to be a dynamo, the system will operate in dynamo mode. In dynamo mode, the boost voltage regulator 9 is not needed in order to drive the LEDs 4, 5, 6. In this mode, the boost voltage regulator is disabled and a bypass circuit 10 is enabled to bypass the boost regulator. The buck LED driver 3 is configured to disable current regulation. The dynamo has a built-in current limit of about 500 mA so further regulation is not required. Alternatively, the buck LED driver is configured to enable current regulation and set a current threshold to protect the circuitry in case the dynamo power source can provide more than the expected amount of current.

When the input power source is determined to be a battery, the system will operate in battery mode. In battery mode, the input voltage will not be sufficient to illuminate all three LEDs. The boost voltage regulator is enabled and the bypass circuit is disabled. The boost voltage regulator will increase the input voltage to a voltage sufficiently higher than the voltage required to illuminate the LEDs. For example, the boost voltage regulator may increase the voltage to 12V. The buck LED driver is configured to enable current regulation and the current regulation is set to a certain value. For example, the LED driver can regulate the LED current to 1000 mA.

Figure 4:
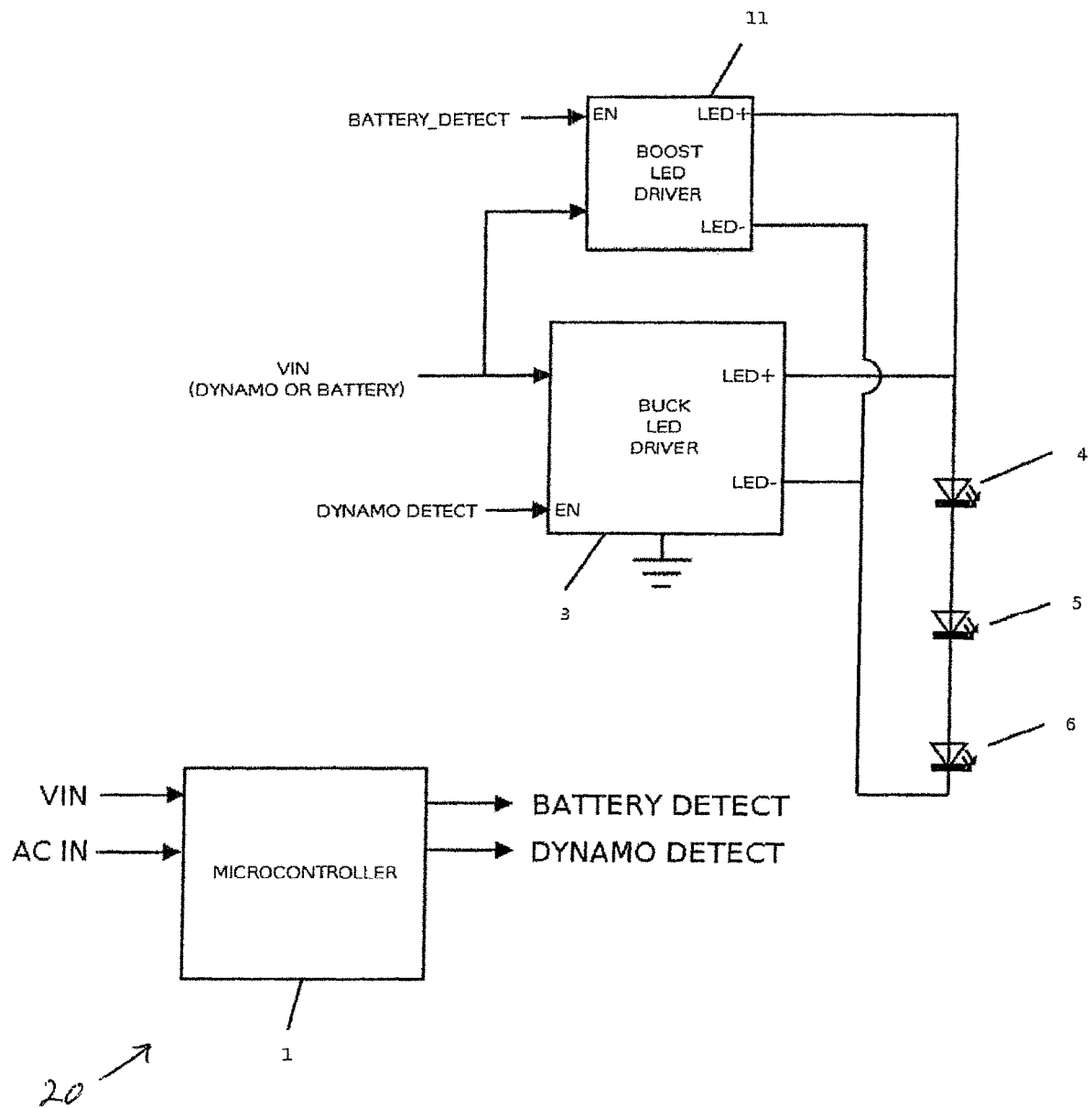
FIG. 4 is schematic diagram of a bicycle light operating in a third dual power mode.

FIG. 4: Dual Power Mode 3—Boost LED Driver in Parallel with Buck LED Driver of Bicycle Light 20

The microcontroller 1 is configured in the same manner as FIG. 2. However, in this drawing there are two separate outputs, BATTERY DETECT and DYNAMO DETECT. When the input power source is determined to be a battery, BATTERY DETECT will be enabled and DYNAMO DETECT will be disabled. When the input power source is determined to be a dynamo, DYNAMO DETECT will be enabled and BATTERY DETECT will be disabled.

When the input power supply is determined to be a dynamo, the system will operate in dynamo mode. In dynamo mode, the buck LED driver 3 is enabled and the boost LED driver 11 is disabled. The buck LED driver is configured to disable current regulation. Alternatively, the buck LED driver is configured to enable current regulation and set a current threshold to protect the circuitry in case the dynamo power source can provide more than the expected amount of current.

When the input power supply is determined to be a battery, the system will operate in battery mode. In battery mode, the boost LED driver is enabled and the buck LED driver is disabled. The boost LED driver is configured to regulate the LED 4, 5, 6 current to a certain value. For example, the LED driver can regulate the LED current to 1000 mA.

Figure 5:
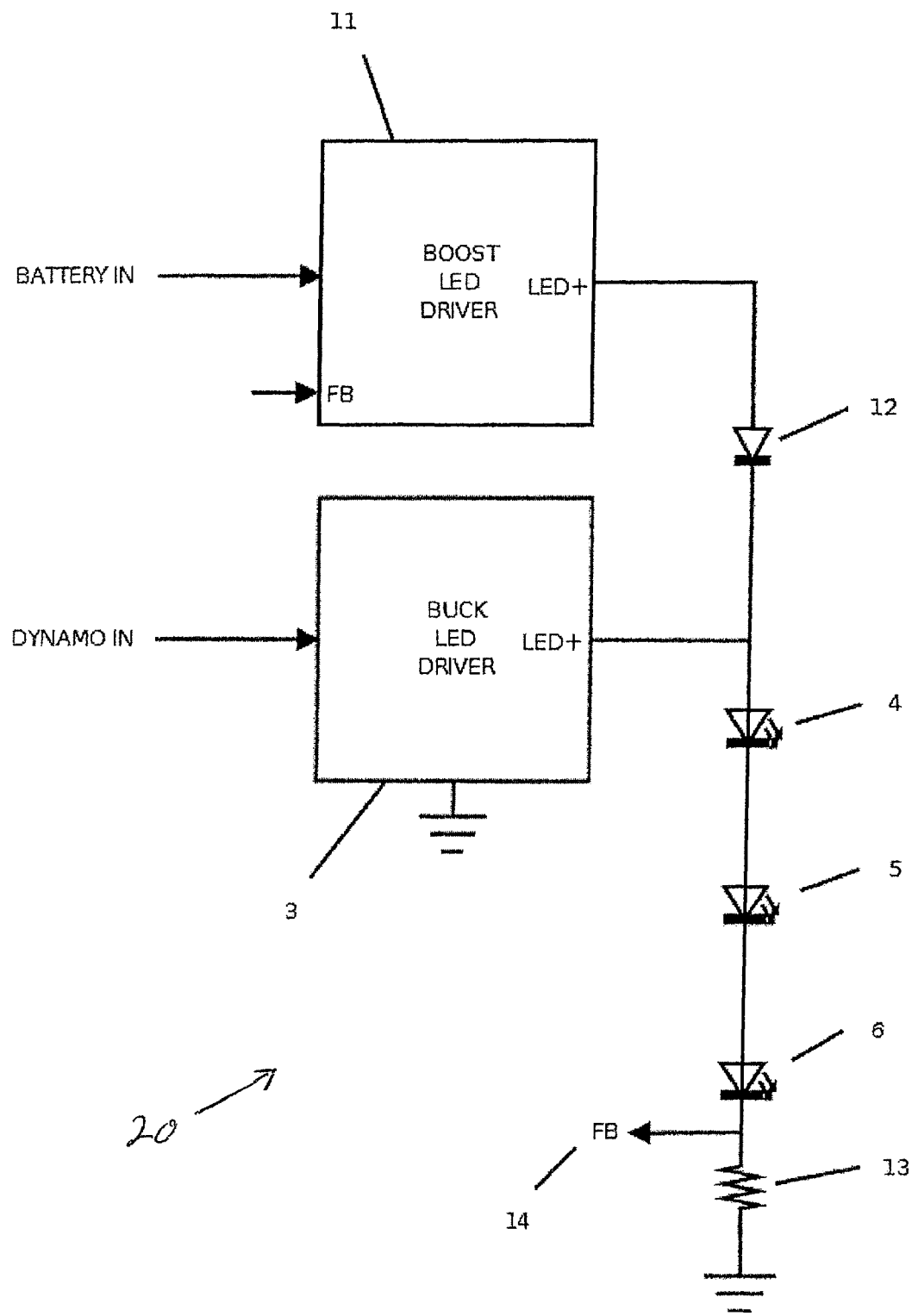
FIG. 5 is schematic diagram of a bicycle light operating with two simultaneous power inputs.

FIG. 5: Simultaneous Power Inputs of Bicycle Light 20

There are two separate power inputs, BATTERY IN and DYNAMO IN. The BATTERY IN connector will be mechanically configured to only connect to a battery input. The DYNAMO IN connector will be mechanically configured to only connect to a dynamo input. Alternatively, there may be circuitry to protect the system in case the incorrect power source is connected to either connector.

The buck LED driver 3 will be configured to disable current regulation. The dynamo may have a current limit of 500 mA so further regulation is not required. Alternatively, the buck LED driver is configured to enable current regulation and set a current threshold to protect the circuitry in case the dynamo power source can provide more than the expected amount of current. If a dynamo power source is connected, any current available from the dynamo power source will be used to power the LEDs 4, 5, 6.

The boost LED driver 11 will be configured to increase the voltage from the battery power source and regulate the LED current. The boost LED driver will be able to work with a wide range of input voltages, and will be able to generate an output voltage of at least 9V, to be able to drive the three LEDs. However, the boost LED driver can be damaged if exposed to higher voltages from the dynamo. A diode 12 is used to protect the boost driver from the higher dynamo voltage. This diode is part of the standard boost LED driver circuitry but will serve an extra function as a means of protection from the higher voltage.

Current flowing through the feedback resistor 13 generates a voltage that is used as a feedback signal 14. The boost LED driver has a feedback control pin. The boost LED driver will use this pin to monitor the feedback signal. The boost LED driver will adjust its output current to regulate the feedback signal to a certain threshold.

If the dynamo power source is not available, the battery power source and boost LED driver will provide all of the LED current. If the dynamo power source is available, it will provide whatever current it can to the LEDs. This current from the dynamo power source will flow through the feedback resistor and will increase the voltage across the feedback resistor. The increased voltage across the feedback resistor due to the current from the dynamo power source will reduce the current required from the boost LED driver in order to raise the voltage across the feedback resistor to the threshold. If enough current is available from the dynamo power source to increase the feedback voltage above the threshold, the boost LED driver will not provide any LED current.

Figure 6:
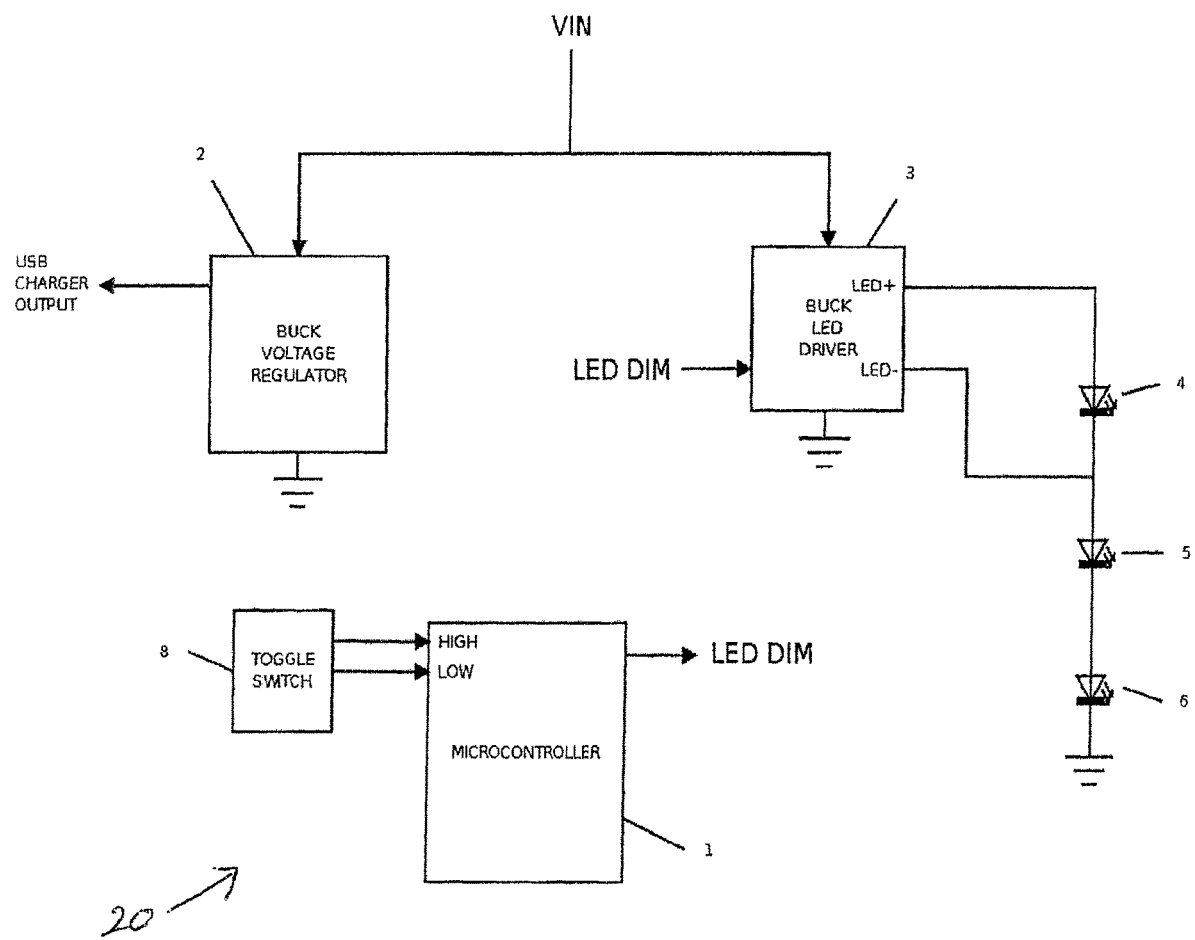
FIG. 6 is schematic diagram of a bicycle light operating with charger priority.

FIG. 6: Charger Priority of Bicycle Light 20

Signals from the toggle switch 8 are connected to pins of the microcontroller 1. The microcontroller pins are configured as inputs.

Firmware running on the microcontroller will monitor the signals from the toggle switch.

The microcontroller will generate an LED DIM signal. This pin is configured as an output.

The input voltage is connected to both the buck voltage regulator 2 and buck LED driver 3. The electrical power output is configured as a USB charger. The buck voltage regulator is configured to generate an output of 5V. In this configuration the buck voltage regulator requires a minimum input voltage above 5V. The buck LED driver is configured to regulate the LED current to 1000 mA. The buck LED driver requires a minimum input voltage above the total forward voltage of the LEDs to be illuminated. Each LED 4, 5, 6 has a forward voltage of approximately 3V. The buck LED driver is configured to control the current through only one LED 4.

The LED DIM signal is used to adjust the average current from the buck LED driver. This is a PWM signal with a duty cycle that can be adjusted from 0% to 100%. The average LED current will be a proportion of the configured maximum of 1000 mA based on the duty cycle of the DIM signal. For example, if the duty cycle of the DIM signal is 30% and the configured maximum LED current is 1000 mA, the average LED current will be (1000 mA×0.3)=300 mA.

When the system is in normal mode, as set by the toggle switch, the microcontroller will drive LED DIM at a duty cycle of 0%. This will result in no current flowing through the buck LED driver. Instead, current will flow from VIN through all three LEDs as long as the voltage of VIN is higher than the forward voltage of the LEDs.

When the system is in charger priority mode, as set by the toggle switch, the microcontroller will drive LED DIM at a duty cycle of less than 100%, but more than 0%. The duty cycle can be pre-set, and/or it can be made user-adjustable. As one non-limiting example, a duty cycle of 30% would result in 300 mA flowing through the one LED. When less than the desired LED current is available from VIN, all available current will flow through the LED and VIN will be limited to the forward voltage of one LED. Once the desired current is available from VIN, the voltage of VIN will begin to rise. Once it rises past 5V the buck voltage regulator will be enabled and will regulate USB CHARGER OUTPUT to 5V. If the USB Charger uses all available current, YIN will remain at the minimum voltage to enable the buck voltage regulator and only the one LED will be illuminated, using the current set by the buck LED driver. If the USB Charger uses less than all the current available the voltage of VIN will begin to rise. Once it rises above the forward voltage of all three LEDs, the remaining two LEDs will begin to illuminate and the brightness of the light will increase.

When the system is in normal mode, more power will be directed to the LEDs and will not be available to the buck voltage regulator and USB charger output. When the system is in charger priority mode, the first power available from VIN is directed to the LEDs, guaranteeing a minimum brightness regardless of how much power is used by the USB charger. Any additional power available from VIN can first be used by the USB charger. Any additional power that is not used by the USB Charger will instead be used by the LEDs.

Figure 7:
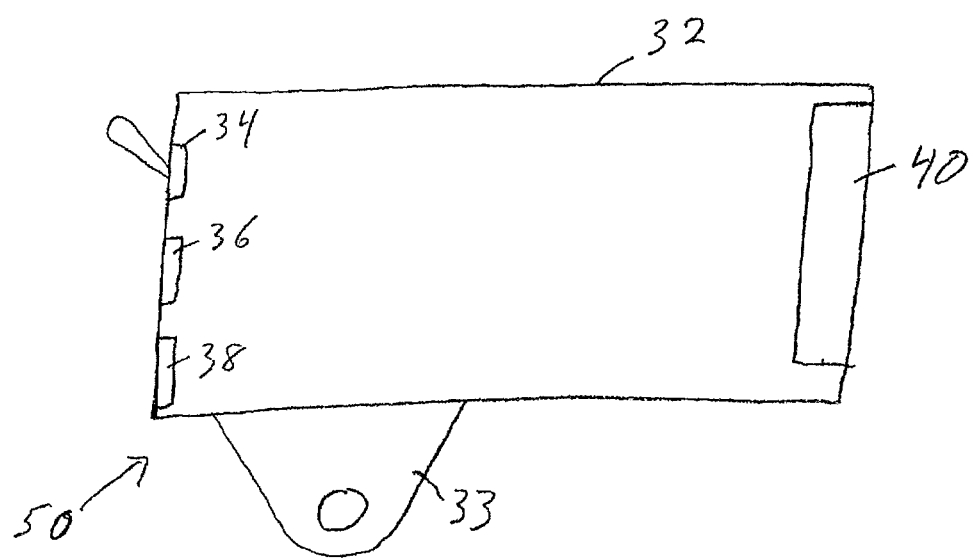
FIG. 7 is schematic diagram of a bicycle light.

The Overall Finished Product:

Headlight 50, FIG. 7, is one non-limiting, simplified example of the present headlight. Depicted in FIG. 7 are housing 32 and mount 33. Toggle switch 34 allows the user to select the mode. The switch could be replaced with an ambient light sensor. The ambient light sensor can be used to automatically select high brightness mode when the ambient light level is low, and low brightness mode when the ambient light level is high. Connectors 36 and 38 are for input power and output power. There can be more or fewer connectors depending on the input and output features of the headlight, as explained elsewhere. LED and lens assembly 40 provides the light output. Not shown in the drawing are the internal battery power source (when used), or any of the electronics that are described above.

The headlight is designed to be mounted in many different places. There are many existing headlight mounts and the headlight is designed to be compatible. Common locations include:

Handlebars
Fork crown
Mid-fork mount
Front rack

Inputs and outputs:
Light
Toggle switch to select mode
Could be any sort of switch
Located on back of light, could be on side or top as well
USB Connector for Charger Output
Standard USB-A receptacle, could be any other connector for use with a converter cable to USB-A
Could be USB-C or any other type of connector
Located on back of light, could be side, top, bottom, or wired in-line connector
Dynamo input
Short wire coming from the bottom of the light, could come from side or back.
Could be a connector instead of a wire
Battery input
Barrel connector located on back of light.
Could instead be a wire coming from the bottom, side, or back of the light.
Obvious differentiation from dynamo input
Incompatible connectors
Taillight output
Short wire coming from the bottom of the light, could come from side or back.
Could be a connector instead of wire.

A number of implementations have been described. Nevertheless, it will be understood that additional modifications may be made without departing from the scope of the inventive concepts described herein, and, accordingly, other embodiments are within the scope of the following claims.

What is claimed is:

1. A bicycle light that is constructed and arranged to be supplied with electrical power by first and second separate power sources, comprising:
a light source; and
a circuit that is adapted to deliver power to the light source simultaneously from both of the first and second separate power sources, wherein the circuit is adapted to regulate current delivered to the light source from the first power source, and wherein current delivered to the light source from the second power source causes a reduction in the current delivered to the light source from the first power source.

2. The bicycle light of claim 1, wherein the power sources comprise an external dynamo power source and a DC power source.

3. The bicycle light of claim 2, further comprising a battery input to the circuit, and wherein the DC power source comprises an external battery power source that is electrically coupled to the battery input.

4. The bicycle light of claim 1, wherein current delivered to the light source from the second power source is sensed through a feedback signal.

5. The bicycle light of claim 4 wherein a change in current delivered to the light source from the second power source results in a change in the feedback signal.

\* \* \* \* \*